United States Patent [19]

Michaelis

[11] Patent Number: 5,308,899
[45] Date of Patent: May 3, 1994

[54] POLYETHER POLYOL AND POLYURETHANE COMPOSITIONS PROTECTED AGAINST OXIDATION AND CORE SCORCHING

[75] Inventor: Peter Michaelis, Freiburg, Fed. Rep. of Germany

[73] Assignee: Ciba-Geigy Corporation, Ardsley, N.Y.

[21] Appl. No.: 976,732

[22] Filed: Nov. 16, 1992

[30] Foreign Application Priority Data

Nov. 19, 1991 [CH] Switzerland ............... 3370/91-7

[51] Int. Cl.$^5$ .................... C08K 5/15; C08K 5/34
[52] U.S. Cl. .................... 524/109; 524/111; 524/83; 524/96; 524/99; 524/100; 524/102; 524/257; 524/258; 252/396
[58] Field of Search ............ 252/396; 524/83, 96, 524/99, 100, 102, 109, 111, 257, 258

[56] References Cited

U.S. PATENT DOCUMENTS

| | | | |
|---|---|---|---|
| 3,280,049 | 10/1966 | Hyre et al. | 128/117 |
| 3,494,880 | 2/1970 | Austin | 521/174 |
| 4,007,230 | 2/1977 | Hinze | 252/703 |
| 4,021,385 | 5/1977 | Austin et al. | 521/174 |
| 4,054,551 | 10/1977 | Layer | 524/96 |
| 4,070,304 | 1/1978 | Hinze | 252/404 |
| 4,265,783 | 5/1981 | Hinze | 252/182 |
| 4,275,173 | 6/1981 | Hinze | 521/117 |
| 4,325,863 | 4/1982 | Hinsken et al. | 524/111 |
| 4,327,008 | 4/1982 | Schimmel et al. | 524/111 |
| 4,338,244 | 7/1982 | Hinsken et al. | 524/109 |
| 4,360,621 | 11/1982 | Kimura et al. | 524/255 |
| 4,611,016 | 9/1986 | Hinsken et al. | 524/99 |

FOREIGN PATENT DOCUMENTS 0415887 3/1991 European Pat. Off. .

*Primary Examiner*—Kriellion S. Morgan
*Attorney, Agent, or Firm*—Luther A. R. Hall

[57] ABSTRACT

Described are compositions protected against thermal and oxidative degradation that comprise
A) a polyether polyol or mixtures of such polyols,
B) at least one benzofuranone derivative of formula I,

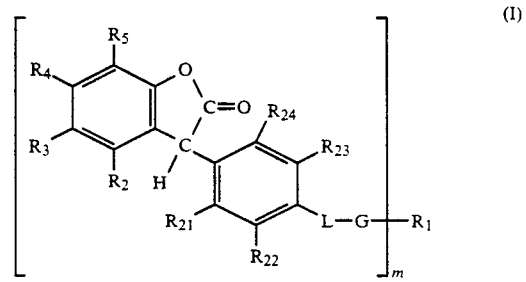

wherein L, G, m, $R_1$ to $R_5$ and $R_{21}$ to $R_{24}$ are as defined in claim 1,
C) at least one compound from the group of the phenolic anti-oxidants, and/or
D) at least one compound from the group of the amino anti-oxidants of the secondary amine type. Also polyurethane(s) (foam(s)) prepared therefrom are protected against thermal and oxidative degradation, especially against core scorching.

12 Claims, No Drawings

POLYETHER POLYOL AND POLYURETHANE COMPOSITIONS PROTECTED AGAINST OXIDATION AND CORE SCORCHING

The invention relates to polyether polyol and polyurethane compositions that are protected especially against oxidation and against the undesired phenomenon of core scorching during the preparation of polyurethane foam by the presence of at least one benzofuran-2-one derivative and at least one further compound from the group of the phenolic anti-oxidants and/or from the group of the amino anti-oxidants of the secondary amine type, as well as to the use of the said derivatives and compounds as additives for the prevention of the said phenomena, and to a process for the preparation of polyurethane using those derivatives and compounds.

Currently, 2,6-di-tert-butyl-4-methylphenol ("butylated hydroxytoluene", "BHT") is generally used in practice for the above-mentioned purposes, but the improvements in stabilisation achieved with it are not satisfactory.

Combinations of specific anti-oxidants have also been proposed, such as mixtures of sterically hindered phenols (see, for example, U.S. Pat. No. 3,280,049, U.S. Pat. Nos. 4,007,230, 3,494,880), or mixtures of sterically hindered phenols with specific diphenylamines (see, for example, U.S. Pat. Nos. 4,070,304, 4,265,783, 4,275,173 and 4,021,385). The stabilisers and/or mixtures of stabilisers proposed in those specifications do not, however, meet the stringent demands made on them in practice.

Benzofuranone derivatives are already known as stabilisers for various organic materials (e.g. U.S. Pat. No. 4,611,016; EP-0 415 887).

Surprisingly, it has now been discovered that it is possible to prepare compositions that are very effectively protected against oxidation by adding to polyether polyols a combination of at least one benzofuran-2-one derivative with at least one further anti-oxidant from the group of the phenolic anti-oxidants and/or the amino anti-oxidants of the secondary amine type, from which compositions it is possible to produce polyurethane foams without the interference of core scorching.

The invention thus relates to compositions comprising
A) a polyether polyol or mixtures of such polyols,
B) at least one benzofuranone derivative of formula I

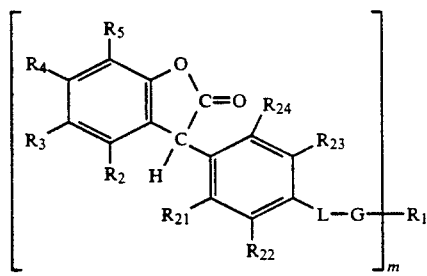

wherein
L is oxygen or, when G is a direct bond and $R_1$ is hydrogen, $C_1-C_4$alkyl or $C_1-C_4$alkoxy, does not exist,
G is a direct bond or a group $-CR_{18}R_{19}-CO-$,
m is 1 or 2, $R_1$, when m=1 and G is a direct bond, is hydrogen, $C_1-C_{25}$alkyl, $C_3-C_{25}$alkenyl, $C_2-C_{18}$alkanoyl, $C_3-C_{25}$alkenoyl, $C_7-C_9$phenylalkyl, unsubstituted or $C_1-C_4$alkyl-substituted phenyl, unsubstituted or $C_1-C_4$alkyl-substituted $C_5-C_8$cycloalkyl, $C_3-C_{25}$alkyl, -alkanoyl or -alkenyl interrupted by oxygen, sulfur or by $>NR_{16}$, $C_6-C_9$cycloalkoxycarbonyl, benzoyl or $C_1-C_{12}$alkyl-substituted benzoyl, or $R_1$, when m=2 and G is a direct bond, is $-CO-R_{1-7}-CO-$, or $R_1$, when m=1 and G is a group $-CR_{18}R_{19}-CO-$, is hydroxy, $C_1-C_{30}$alkoxy, $C_3-C_{30}$alkoxy interrupted by oxygen, sulfur or by $>NR_{13}$, $C_7-C_9$phenylalkoxy, $C_5-C_{12}$cycloalkoxy, cycloalkoxy, $C_2-C_{18}$alkenyloxy, unsubstituted or $C_1-C_{12}$alkyl-substituted phenoxy,

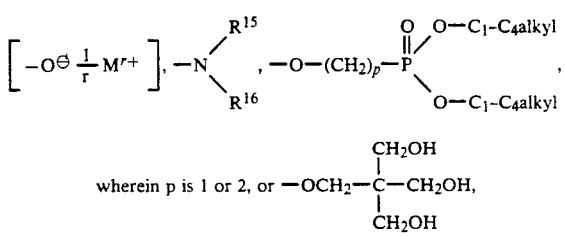

wherein p is 1 or 2, or $-OCH_2-\underset{\underset{CH_2OH}{|}}{\overset{\overset{CH_2OH}{|}}{C}}-CH_2OH$, or $R_1$, when m=2 and G is a group $-CR_{18}R_{19}-CO-$, is $C_2-C_{12}$alkanedioxy, $C_3-C_{25}$alkanedioxy interrupted by oxygen, sulfur or by $>NR_{16}$,

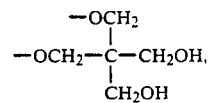

$-OCH_2-CH=CH-CH_2O-$ or $OCH_2-C\equiv C-CH_2O-$, $R_2$ and $R_4$ are each, independently of the other, hydrogen or $C_1-C_6$alkyl,
$R_3$ and $R_5$ are each, independently of the other, hydrogen, $C_1-C_{25}$alkyl, $C_7-C_9$phenylalkyl, unsubstituted or $C_1-C_4$alkyl-substituted phenyl, unsubstituted or $C_1-C_4$alkyl-substituted $C_5-C_8$cycloalkyl, $C_1-C_{18}$alkoxy, hydroxy, $C_1-C_{25}$alkanoyloxy, $C_3-C_{25}$alkenoyloxy, $C_3-C_{25}$alkenyloxy interrupted by oxygen, sulfur or by $>NR_{16}$, $C_6-C_9$cycloalkylcarbonyloxy, benzoyloxy or $C_1-C_{12}$alkyl-substituted benzoyloxy, or a radical of the formula $-(CH_2)_n-CO-OR_6$, $-(CH_2)_n-COR_{11}$, or $-(CH_2)_n-CO-N(R_7)_2$, $R_3$, when m=1, is furthermore a radical of the formula $-(CH_2)_n-CO-O-A^*-O-CO-(CH_2)_n-E$, $-(CH_2)_n-CO-NR_8-A^*-NR_8-CO-(CH_2)_n-E$, $-(CH_2)_n-CO-NR_8-A^*-O-CO-(CH_2)_n-E$,

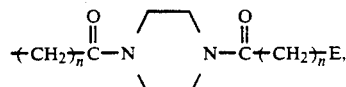

-continued
—CH$_2$—S—R$_9$, —CH(C$_6$H$_5$)—CO—R$_6$ or when m=1 and R$_4$, R$_5$, R$_{21}$ and R$_{24}$ are hydrogen, R$_3$ in addition is a radical of the formula

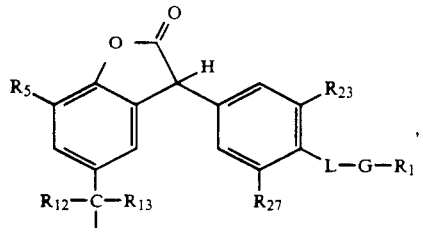

R$_2$ together with R$_3$ or
R$_4$ together with R$_5$, in each case together with the carbon atoms to which they are bonded, form a phenyl ring,
R$_6$ is hydrogen, C$_2$-C$_{18}$alkyl, C$_1$-C$_{18}$alkyl interrupted by oxygen or sulfur, C$_3$-C$_{16}$dialkylaminoalkyl, cyclohexyl, phenyl, or phenyl substituted by from 1 to 3 alkyl radicals together having a maximum of 18 carbon atoms,
n is 0, 1 or 2, the substituents
R$_7$ are each, independently of the other, hydrogen, C$_1$-C$_{18}$alkyl, cyclopentyl, cyclohexyl. phenyl, phenyl substituted by 1 or 2 alkyl radicals together having a maximum of 16 carbon atoms, a radical of the formula —C$_2$H$_4$OH, —C$_2$H$_4$—O—C$_q$H$_{2q+1}$ or —C$_2$H$_4$—O—CO—R$_{10}$, or, together with the nitrogen atom to which they are bonded, form a piperidine or morpholine radical, wherein q is 1 to 18,
R$_8$ is hydrogen, alkyl having from 1 to 18 carbon atoms, cyclopentyl, cyclohexyl, phenyl, benzyl, phenyl substituted by 1 or 2 alkyl radicals together having a maximum of 16 carbon atoms,
R$_9$ is alkyl having from 1 to 18 carbon atoms,
R$_{10}$ is hydrogen, alkyl having from 1 to 22 carbon atoms or cycloalkyl having from 5 to 12 carbon atoms,
R$_{11}$ is hydroxy, $$\left[ -O^\ominus \frac{1}{r} M^{r+} \right],$$

C$_1$-C$_{18}$alkoxy or —NR$_{14}$R$_{15}$,
R$_{12}$ and R$_{13}$ are each, independently of the other, hydrogen, C$_1$-C$_{12}$alkyl or phenyl, or form together with the C-atom to which they are bound a C$_5$-C$_7$-alkylidene-ring which is unsubstituted or substituted by 1 to 3 C$_1$-C$_4$alkyl groups,
R$_{14}$ and R$_{15}$ are each, independently of the other, hydrogen or C$_1$-C$_{18}$alkyl, M is an r-valent metal cation and r is 1, 2 or 3,
A* is an alkylene radical having from 2 to 22 carbon atoms that may or may not be interrupted by nitrogen, oxygen or by sulfur,
Y is —O—, —S—, —SO—, —SO$_2$— or —C(R$_{20}$)$_2$—, wherein the substituents
R$_{20}$ are each, independently of the other, hydrogen, C$_1$-C$_{16}$alkyl, phenyl or a radical of the formula —(CH$_2$)$_n$—CO—OR$_6$ or —(CH$_2$)$_n$—CO—N(R$_7$)$_2$, E is a radical of the formula

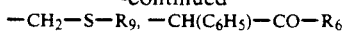

R$_{16}$ is hydrogen or C$_1$-C$_8$alkyl,
R$_{17}$ is a direct bond, C$_1$-C$_{18}$alkylene, C$_2$-C$_{18}$alkylene interrupted by oxygen, sulfur or by >NR$_{16}$, C$_2$-C$_{18}$alkenylene, C$_2$-C$_{20}$alkylidene, C$_7$-C$_{20}$-phenylalkylidene, C$_5$-C$_8$cycloalkylene, C$_7$-C$_8$-bicycloalkylene or phenylene,
R$_{18}$ and R$_{19}$ are each, independently of the other, hydrogen, C$_1$-C$_4$alkyl or phenyl, and
R$_{21}$, R$_{22}$, R$_{23}$ and R$_{24}$ are each, independently of the others, hydrogen, C$_1$-C$_4$alkyl or C$_1$-C$_4$alkoxy, provided that at least one of the radicals R$_{21}$, R$_{22}$, R$_{23}$ and R$_{24}$ is hydrogen,
C) at least one compound from the group of the phenolic anti-oxidants, and/or
D) at least one compound from the group of the amino anti-oxidants of the secondary amine type.

In a further embodiment the invention relates to compositions comprising
A) a polyether polyol or mixtures of such polyols,
B) at least one benzofuranone derivative of formula Ia (Ia)

wherein
R*$_1$ is phenyl, or phenyl substituted by from 1 to 3 alkyl radicals together having a maximum of 12 carbon atoms or by alkoxy having from 1 to 12 carbon atoms,
R*$_2$ is hydrogen and R*$_4$ is hydrogen, alkyl having from 1 to 12 carbon atoms, cyclopentyl, cyclohexyl or chlorine,
R*$_3$ has the same meaning as R*$_2$ or R*$_4$ or is a radical of the formula —(CH$_2$)$_n$—CO—OR*$_6$, —(CH$_2$)$_n$—CO—N(R*$_7$)$_2$, —(CH$_2$)$_n$—CO—O—A*—O—CO—(CH$_2$)$_n$—E*, —(CH$_2$)$_n$—CO—NR*$_8$—A*—NR*$_8$—CO—(CH$_2$)$_n$—E*, —(CH$_2$)$_n$—CO—N-R*$_8$—A*—O—CO—(CH$_2$)$_n$—E*,

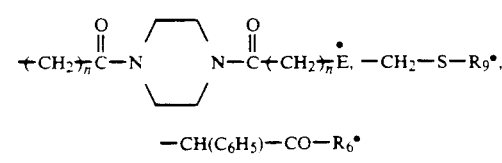

or —Y*—E* wherein $R^*_6$ is hydrogen, alkyl having from 2 to 18 carbon atoms, alkyl having from 1 to 18 carbon atoms that is interrupted by oxygen or by sulfur, dialkylaminoalkyl having a total of from 3 to 16 carbon atoms, cyclopentyl, cyclohexy, phenyl, or phenyl substituted by from 1 to 3 alkyl radicals together having a maximum of 18 carbon atoms, n is 0, 1 or 2, the substituents $R^*_7$ are each, independently of the other, hydrogen, alkyl having from 1 to 18 carbon atoms, cyclopentyl, cyclohexyl, phenyl, phenyl substituted by 1 or 2 alkyl radicals together having a maximum of 16 carbon atoms, a radical of the formula $-C_2H_4OH$, $-C_2H_4-O-C_qH_{2q+1}$ or $-C_2H_4-O-CO-R^*_{10}$, or, together with the nitrogen atom to which they are bonded, form a piperidine or morpholine radical, q is from 1 to 18, $R^*_{10}$ is hydrogen, alkyl having from 1 to 22 carbon atoms or cycloalkyl having from 5 to 12 carbon atoms, $A^*$ is an alkylene radical having from 2 to 22 atoms that may or may not be interrupted by nitrogen, oxygen or by sulfur, $R^*_8$ is hydrogen, alkyl having from 1 to 18 carbon atoms, cyclopentyl, cyclohexyl, phenyl, phenyl substituted by 1 or 2 alkyl radicals together having a maximum of 16 carbon atoms, or benzyl, $R^*_9$ is alkyl having from 1 to 18 carbon atoms, $Y^*$ is $-O-$, $-S-$, $-SO-$, $-SO_2-$ or $C(R^*_{11})_2-$, the substituents $R^*_{11}$ are each, independently of the other, hydrogen, alkyl wherein the alkyl radicals together have a maximum of 16 carbon atoms, phenyl or a radical of the formula $-(CH_2)_n-CO-OR^*_6$ or $-(CH_2)_n-CO-N(R^*_7)_2$ wherein n, $R^*_6$ and $R^*_7$ have the meanings given, $E^*$ is a radical of the formula

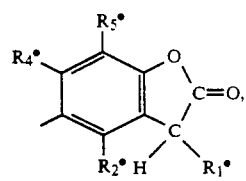

wherein $R^*_1$, $R^*_2$ and $R^*_4$ have the meanings given, and $R^*_5$ is hydrogen, alkyl having from 1 to 20 carbon atoms, cyclopentyl, cyclohexyl, chlorine or a radical of the formula $-(CH_2)_n-CO-OR^*_6$ or $-(CH_2)_n-CO-N(R^*_7)_2$ wherein $R^*_6$ and $R^*_7$ have the meanings given, or $R^*_5$ together with $R^*_4$ forms a tetramethylene radical, C) at least one compound from the group of the phenolic anti-oxidants, and/or D) at least one compound from the group of the amino anti-oxidants of the secondary amine type.

Preferably, the phenolic component C) corresponds to formula II,

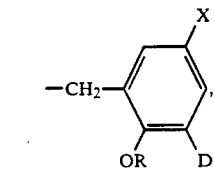 (II)

wherein

A is hydrogen, $C_1-C_{24}$alkyl, $C_5-C_{12}$cycloalkyl, phenyl-$C_1-C_4$alkyl, phenyl or a group $-CH_2-S-R_{25}$ or

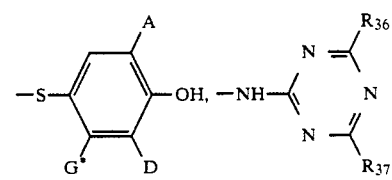

D is $C_1-C_{24}$alkyl, $C_5-C_{12}$cycloalkyl, phenyl-$C_1-C_4$alkyl, phenyl or a group $-CH_2-S-R_{25}$, X is hydrogen, $C_1-C_{18}$alkyl or one of the groups $-C_aH_{2a}-S_q-R_{26}$, $-C_bH_{2b}-CO-OR_{27}$, $-C_bH_{2b}-CO-N(R_{29})(R_{30})$, $-CH_2N(R_{34})(R_{35})$,

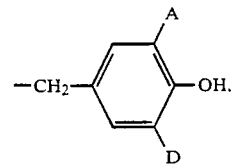

and

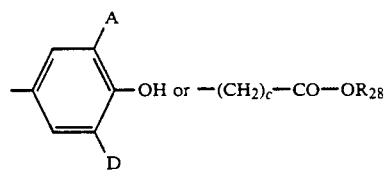

R is hydrogen or a group of the formula $-CO-CH=CH_2$, $G^*$ is hydrogen or $C_1-C_{12}$alkyl, $R_{25}$ is $C_1-C_{18}$alkyl, phenyl or a group $-(CH_2)_c-CO-OR_{28}$ or $-CH_2CH_2OR_{33}$, $R_{26}$ is hydrogen, $C_1-C_{18}$alkyl, phenyl, benzyl or a group

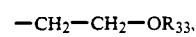

or $-CH_2-CH_2-OR_{33}$, $R_{27}$ is $C_1-C_{30}$alkyl or one of the groups $-CHR_{31}-CH_2-S-R_{32}$,

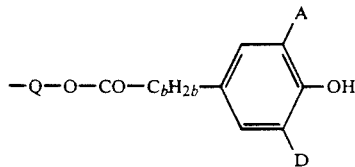

and

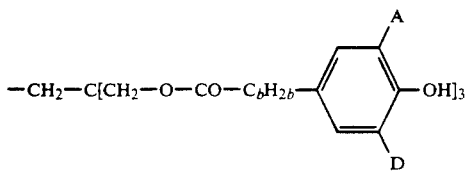

wherein Q is $C_2$-$C_8$alkylene, $C_4$-$C_6$thiaalkylene or a group —$CH_2CH_2(OCH_2CH_2)_d$—, $R_{28}$ is $C_1$-$C_{24}$alkyl, $R_{29}$ is hydrogen, $C_1$-$C_{18}$alkyl or cyclohexyl, $R_{30}$ is $C_1$-$C_{18}$alkyl, cyclohexyl, phenyl, phenyl substituted by $C_1$-$C_{18}$alkyl, or one of the groups

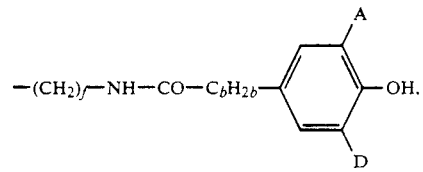

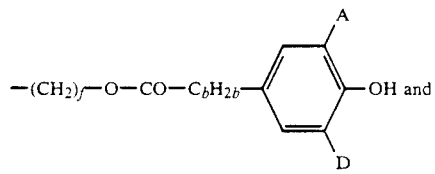

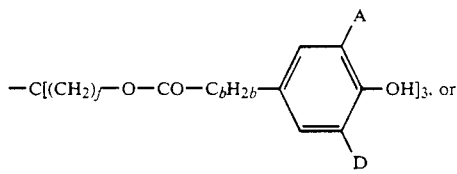

$R_{29}$ and $R_{30}$ together are $C_4$-$C_8$alkylene that may be interrupted by —O— or —NH—, $R_{31}$ is hydrogen, $C_1$-$C_4$alkyl or phenyl, $R_{32}$ is $C_1$-$C_{18}$alkyl, $R_{33}$ is hydrogen, $C_1$-$C_{24}$alkyl, phenyl, $C_2$-$C_{18}$alkanoyl or benzoyl, $R_{34}$ is $C_1$-$C_{18}$alkyl, cyclohexyl, phenyl, phenyl substituted by $C_1$-$C_{18}$alkyl, or a group

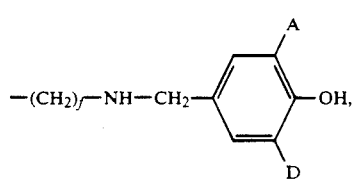

$R_{35}$ is hydrogen, $C_1$-$C_{18}$alkyl, cyclohexyl, or a group

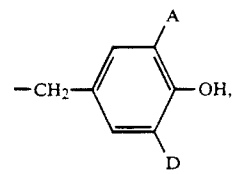

or $R_{34}$ and $R_{35}$ together are $C_4$-$C_8$alkylene, which may be interrupted by —O— or —NH—, $R_{36}$ and $R_{37}$ are —S—$C_1$-$C_{18}$alkyl, a is 0, 1, 2 or 3, b is 0, 1, 2 or 3, c is 1 or 2, d is from 1 to 5, f is from 2 to 8 and q is 1, 2, 3 or 4.

Component C) corresponds more preferably to compounds of formula II wherein

A is hydrogen, $C_1$-$C_8$alkyl, cyclohexyl, phenyl or a group —$CH_2$—$R_{36}$ or

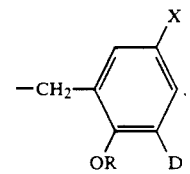

D is $C_1$-$C_8$alkyl, cyclohexyl, phenyl or a group —$CH_2$—$R_{37}$,

X is hydrogen, $C_1$-$C_8$alkyl or one of the groups —$C_aH_{2a}$—$S_q$—$R_{26}$, —$C_bH_{2b}$—CO—$OR_{27}$, —$CH_2N(R_{34})(R_{35})$,

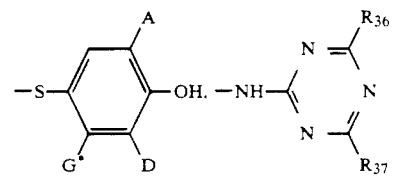

and

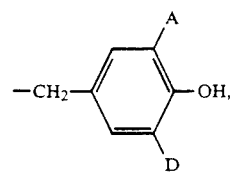

$R_{26}$ is $C_1$-$C_{12}$alkyl, phenyl or a group —($CH_2$)$_c$—CO—$OR_{28}$, $R_{27}$ is $C_1$-$C_{18}$alkyl or a group

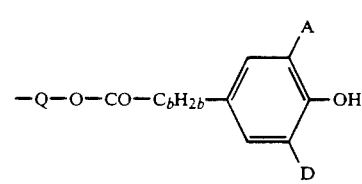

wherein Q is $C_2$-$C_8$alkylene, —$CH_2$—$CH_2$—S—$CH_2CH_2$ or a group —$CH_2CH_2(OCH_2CH_2)_d$—, $R_{28}$ is $C_1$-$C_{18}$alkyl, $R_{34}$ and $R_{35}$ are each, independently of the other, hydrogen or $C_1$-$C_{12}$alkyl or $R_{34}$ and $R_{35}$ together are $C_4$-$C_8$alkylene which may be interrupted by —O— or —NH—, a is 1 or 2, b is 1 or 2, c is 1 or 2, and d is 1, 2 or 3.

Most especially preferred as component C) are compounds of formula II wherein

A is hydrogen, $C_1$-$C_6$alkyl, —$CH_2$—$R_{36}$ or a group

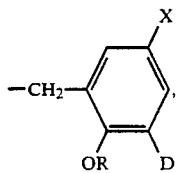

D is hydrogen or $C_1$-$C_{18}$alkyl, and

X is hydrogen, $C_1$-$C_4$alkyl, —$CH_2$—$R_{36}$ or a group of the formula

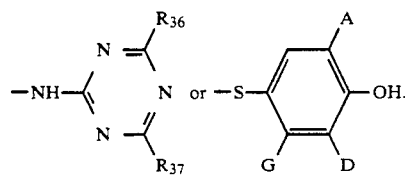

The amino component D) preferably corresponds to formula III

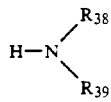

(III)

wherein $R_{38}$ is $C_1$-$C_{18}$alkyl, phenyl—$C_1$-$C_4$alkyl, $C_5$-$C_{12}$cycloalkyl, phenyl, or phenyl or naphthyl substituted by $C_1$-$C_{12}$alkyl or by $C_1$-$C_{12}$alkoxy, $R_{39}$ is phenyl, naphthyl, or phenyl or naphthyl substituted by $C_1$-$C_{12}$alkyl or by $C_1$-$C_{12}$alkoxy, or $R_{38}$ and $R_{39}$ together form a radical of the formula IV

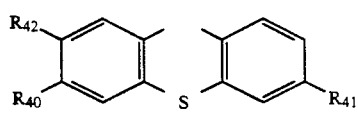

(IV)

wherein $R_{40}$ and $R_{41}$ are hydrogen or $C_1$-$C_{18}$alkyl or $R_{41}$ is hydrogen or $C_1$-$C_{18}$alkyl and $R_{40}$ together with $R_{42}$ forms a group of the formula

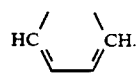

More preferably component D) corresponds to formula III wherein $R_{38}$ und $R_{39}$ are each, independently of the other, phenyl or phenyl substituted by $C_1$-$C_{12}$alkyl, or together form a radical of the formula IV.

In formula III $R_{38}$ and $R_{39}$ most preferably form a radical of the formula IV wherein $R_{40}$ and $R_{41}$ are $C_6$-$C_{12}$alkyl and $R_{42}$ is hydrogen, or component D) is a commercial mixture obtained by reacting diphenylamine with diisobutylene, comprising a) diphenylamine;
b) 4-tert-butyldiphenylamine;
c) compounds from the group
  i) 4-tert-octyldiphenylamine,
  ii) 4,4'-di-tert-butyldiphenylamine,
  iii) 2,4,4'-tris-tert-butyldiphenylamine,
d) compounds from the group
  i) 4-tert-butyl-4'-tert-octyldiphenylamine,
  ii) o,o'-,m,m'-, or p,p'-di-tert-octyldiphenylamine,
  iii) 2,4-di-tert-butyl-4'-tert-octyldiphenylamine,
e) compounds from the group
  i) 4,4'-di-tert-octyldiphenylamine,
  ii) 2,4,-di-tert-octyl-4'-tert-butyldiphenylamine, and wherein not more than 5% of component a), 8 to 15% b), 24 to 32% c), 23 to 34% d) and 21 to 34% e) are present.

Alkyl substituents in the compounds of formulae I, II and III may contain up to 30 carbon atoms. Examples of such substituents are methyl, ethyl, propyl, butyl, pentyl, hexyl, octyl, nonyl, decyl, undecyl, dodecyl, tetradecyl, hexadecyl, octadecyl, eicosyl or docosyl and corresponding branched isomers, especially tert-butyl, i-octyl and i-dodecyl. Alkoxy, alkanedioxy, alkanoyl and alkoxycarbonyl radicals are clearly derived from those groups as are also alkylene radicals contained in the definitions of the substituents shown in formulae I-III. The alkyl radicals listed and groups derived therefrom may be interrupted by oxygen or by sulfur in order especially to form structural units such as —$CH_2CH_2$—O—$CH_2CH_2$—, —$CH_2CH_2$—S—$CH_2CH_2$— or —O—$(CH_2)_6$—O—.

Alkenyl radicals are derived from alkyl radicals by the replacement of one or more C—C single bonds by C═C double bonds. Allyl and isoallyl are preferred. Alkenyloxy is derived from alkenyl by adding —O—.

If some radicals are $C_5$-$C_{12}$cycloalkyl, then those include, for example, cyclopentyl, cyclohexyl, cycloheptyl, cyclooctyl, cyclodecyl and cyclododecyl. Cyclopentyl, cyclohexyl and cycloheptyl are preferred, with cyclohexyl being especially preferred. Cycloalkoxy and cycloalkoxycarbonyl radicals are derived therefrom by adding —CO— or —O—CO— groups.

Phenyl-$C_{1-4}$alkyl and $C_7$-$C_9$phenylalkyl are, e.g., benzyl, phenethyl, 3-phenylpropyl, α-methylbenzyl and α,α-dimethylbenzyl. Benzyl is preferred.

The benzofuranones of formula I preferably used are those wherein $R_1$, when m=1 and G is a direct bond, is hydrogen, $C_1$-$C_{18}$alkyl, $C_3$-$C_{18}$alkenyl, $C_2$-$C_{18}$alkanoyl, $C_3$-$C_{18}$alkenoyl, benzyl, phenyl or $C_1$-$C_4$alkyl-substituted phenyl, $C_5$-$C_8$cycloalkyl, $C_3$-$C_{18}$-alkyl, -alkanoyl or -alkenyl interrupted by oxygen, sulfur or by >$NR_{16}$, $C_6$-$C_9$cycloalkoxycarbonyl, benzoyl, or $C_1$-$C_8$alkyl-substituted benzoyl, or $R_1$, when m=2 and G is a direct bond, is —CO—$R_{1-7}$—CO—, or $R_1$, when m=1 and G is a group —$CR_{18}R_{19}$—CO—, is hydroxy, $C_1$-$C_{18}$alkoxy, $C_3$-$C_{18}$alkoxy interrupted by oxygen, sulfur or by >$NR_{13}$, benzloxy, $C_5$-$C_8$cycloalkoxy, unsubstituted or $C_1$-$C_8$alkyl-substituted phenoxy, —$NR_{14}R_{15}$ or

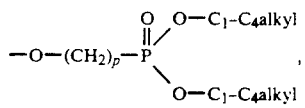

or

R₁, when m=2 and G is a group —CR₁₈R₁₉—CO—, is $C_2$-$C_{12}$alkanedioxy, or $C_3$-$C_{25}$alkanedioxy interrupted by oxygen, R₂ and R₄ are hydrogen, R₃ and R₅ are each, independently of the other, hydrogen, $C_1$-$C_{18}$alkyl, $C_7$-$C_9$phenylalkyl, benzyl, phenyl, $C_5$-$C_8$cycloalkyl, $C_1$-$C_8$alkoxy, hydroxy, $C_1$-$C_{18}$alkanoyloxy, $C_3$-$C_{18}$alkenoyloxy or benzoyloxy, or a radical of the formula —(CH₂)ₙ—CO—OR₆ or —(CH₂)ₙ—CO—N(R₇)₂, and R₃, when m=1, is in addition a radical of the formula —Y—E, R₁₇ is a direct bond, $C_1$-$C_{12}$alkylene, $C_2$-$C_{12}$alkylene interrupted by oxygen, sulfur or by >NR₁₆, $C_2$-$C_{12}$alkenylene, $C_2$-$C_{12}$alkylidene, $C_7$-$C_{12}$phenylalkylidene, $C_5$-$C_8$cycloalkylene or phenylene.

Of those there are preferred compounds of formula I, wherein m=1 and

R₁, when G is a direct bond, is hydrogen, $C_1$-$C_{18}$alkyl, $C_2$-$C_{18}$alkanoyl, $C_3$-$C_4$alkenyl, $C_3$-$C_{18}$alkenoyl, benzyl, $C_5$-$C_8$cycloalkyl, or $C_3$-$C_{18}$-alkyl or -alkanoyl interrupted by oxygen, or R₁, when G is a group —CR₁₈R₁₉—CO—, is hydroxy, $C_1$-$C_{18}$alkoxy, $C_3$-$C_{18}$alkoxy interrupted by oxygen, unsubstituted or $C_1$-$C_8$alkyl-substituted phenoxy, —NR₁₄R₁₅ or

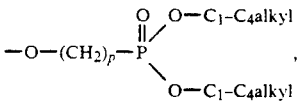

R₂, R₄, R₂₁ and R₂₄ are each, independently of the other, hydrogen or $C_1$-$C_4$alkyl, R₅ is hydrogen or $C_1$-$C_{14}$alkyl, and R₃ is hydrogen, $C_1$-$C_{12}$alkyl, $C_1$-$C_8$alkoxy, —(CH₂)ₙ—CO—OR₆, —(CH₂)ₙ—CO—N(R₇)₂, —(CH₂)ₙ—CO—OR₁₁ or —Y—E.

Among those preference is given to those compounds of formula I wherein

R₁, when G is a direct bond, is hydrogen, $C_1$-$C_{18}$alkyl, benzyl, allyl, isoallyl, $C_1$-$C_{18}$alkanoyl, or $C_1$-$C_{12}$alkanoyl interrupted by oxygen, or R₁, when G is a group —CR₁₈R₁₉—CO—, is hydroxy, $C_1$-$C_{18}$alkoxy, unsubstituted or $C_1$-$C_4$alkyl-substituted phenoxy, —NR₁₄R₁₅ or

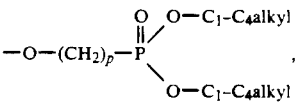

R₂ and R₄ are hydrogen,

R₃ and R₅ are each, independently of the other, $C_1$-$C_{18}$alkyl interrupted by oxygen, or $C_1$-$C_4$alkoxy or cyclohexyl and R₃ in addition is a group —(CH₂)ₙ—CO—OR₁₁ wherein R₁₁ is hydrogen or $C_1$-$C_4$alkyl, and R₁₄ and R₁₅ are hydrogen or $C_1$-$C_4$alkyl.

The polyethers comprising at least two, generally from two to eight, preferably two or three, hydroxy groups that are suitable as component A) are of the type known per se and are prepared, for example, by polymerisation of epoxides, such as ethylene oxide, propylene oxide, butylene oxide, tetrahydrofuran, styrene oxide or epichlorohydrin, with themselves, for example in the presence of BF₃, or by addition of those epoxides, optionally as a mixture or one after another, to starting components having reactive hydrogen atoms, such as water, alcohols, ammonia or amines, for example ethylene glycol, propylene glycol-(1,3) and -(1,2), trimethylolpropane, 4,4'-dihydroxy-diphenylpropane, aniline, ethanolamine or ethylenediamine. Sucrose polyethers are also suitable according to the invention. In many cases, preference is given to polyethers having predominantly (up to 90% by weight, based on all the OH groups present in the polyether) primary OH groups. Also suitable are polyethers modified by vinyl polymers, such as those formed, for example, by polymerisation of styrene and acrylonitrile in the presence of polyethers, and polybutadienes comprising OH groups.

Those compounds generally have molecular weights of from 400-10,000. They are polyhydroxy compounds, especially compounds having from two to eight hydroxy groups, particularly those having a molecular weight of from 800 to 10,000, preferably from 1000 to 6000, for example polyethers having at least two, generally from 2 to 8, but preferably from 2 to 4, hydroxy groups, as known per se for the preparation of homogeneous and of cellular polyurethanes.

It is, of course, possible to use mixtures of the above-mentioned compounds comprising at least two hydrogen atoms that are reactive towards isocyanates, especially those having a molecular weight of from 400 to 10,000.

The compositions according to the invention are used especially in the preparation of polyurethane, especially in the preparation of soft polyurethane foams. The compositions according to the invention and the products prepared from them are effectively protected against degradation. In particular core scorching is avoided during foam preparation. In this connection the invention relates also to the use of the combination of component B) with component C) and/or component D) for the stabilisation of polyether polyols and/or soft polyurethane foams prepared therefrom, and also to a process for the preparation of polyurethanes which comprises reacting with a polyisocyanate a polyether polyol stabilised by the addition of component B) in combination with component C) and/or D), and to the polyurethane and the soft polyurethane foam obtained by that process.

Polyisocyanates that can be used in that process are aliphatic, cycloaliphatic, araliphatic, aromatic and heterocyclic polyisocyanates, for example ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate and any desired mixtures of those isomers, 1-isocyanato-3,3,5-trimethyl-5-isocyanatomethylcyclohexane, 2,4- and 2,6-hexahydrotolylene diisocyanate and any desired mixtures of those isomers, hexahydro-1,3- and/or -1,4-phenylene diisocyanate, perhydro-2,4'- and/or -4,4'-diphenylmethane diisocyanate, 1,3- and 1,4-phenylene diisocyanate, 2,4- and 2,6-tolylene diisocyanate and any desired mixtures of those isomers, diphenylmethane-2,4'- and/or -4,4'-diisocyanate, naphthylene-1,5-diisocyanate, triphenylmethane-4,4',4''-triisocyanate, polyphenyl-polymethylene polyisocyanates, such as those obtained by means of aniline-formaldehyde condensation and subsequent phosgenation, m- and p-isocyanatophenylsulfonyl isocyanates, perchlorinated arylpolyisocyanates, polyisocyanates comprising carbodiimide groups, polyisocyanates comprising allophanate groups, polyisocyanates comprising isocyanurate groups, polyisocyanates comprising urethane groups, polyisocyanates comprising acylated urea groups, polyisocyanates comprising biuret groups, polyisocyanates comprising ester groups, reaction products of the above-mentioned isocyanates with acetals, and polyisocyanates comprising polymeric fatty acid radicals.

it is also possible to use the distillation residues comprising isocyanate groups that are obtained in the course of the industrial production of isocyanates, optionally dissolved in one or more of the above-mentioned polyisocyanates. It is also possible to use any desired mixtures of the above-mentioned polyisocyanates.

Special preference is generally given to polyisocyanates that are readily available commercially, for example 2,4- and 2,6-tolylene diosocyanate and any desired mixtures of those isomers ("TDI"), polyphenyl-polymethylene polyisocyanates, such as are prepared by aniline-formaldehyde condensation and subsequent phosgenation ("crude MDI"), and polyisocyanates comprising carbodiimide groups, urethane groups, allophanate groups, isocyanurate groups, urea groups or biuret groups ("modified polyisocyanates").

The benzofuran-2-ones of formula Ia and processes for their preparation are described in U.S. Pat. Nos. 4,325,863 and 4,338,244.

The compounds of formula (I) can be prepared in a manner known per se.

For example, and this is preferred, a phenol of formula (V)

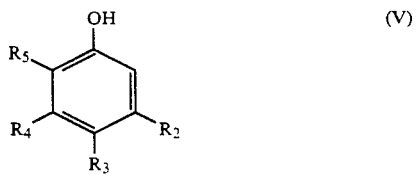

(V)

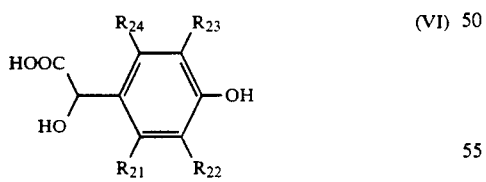

(VI)

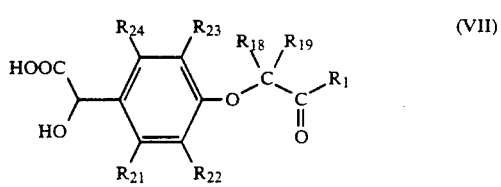

(VII)

is reacted with a mandelic acid substituted at the phenyl ring of formula (VI) or (VII) at elevated temperature, especially at temperatures of from 130° to 200° C. in the melt or in a solvent, optionally under a light vacuum.

The reaction is preferably carried out in a solvent, such as, for example, acetic acid or formic acid, in a temperature range of from 50° to 130° C. The reaction can be catalysed by adding an acid, such as hydrochloric acid, sulfuric acid or methanesulfonic acid. The reaction can be carried out, for example, as described in the literature sources indicated in the introduction of the description.

The 4-hydroxymandelic acids substituted at the phenyl ring of formula (VI) are known in the literature, or can be prepared analogously to the method, for example, according to W. Bradley et al, J. Chem. Soc. 1956, 1622; EP-A-146269 or DE 2 944 295.

The 4-carboxymethoxymandelic acids substituted at the phenyl ring of formula (VII), wherein $R_1$ is hydroxy, can be etherified according to generally known etherification conditions starting from phenols of formula (VI), e.g. according to Organikum 1986, pages 194–200, for example by alkylation under basic conditions with an α-chloroacetic acid derivative of formula

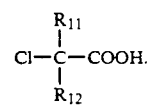

The phenols of formula (V) are also known or can be obtained according to processes known per se.

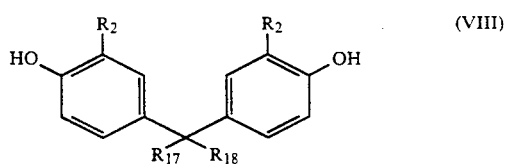

(VIII)

Bisphenol compounds of formula VIII can be prepared according to Houben-Weyl, Methoden der organischen Chemie, Volume 6/1c, 1030.

The 3-(carboxymethoxyphenyl)benzofuran-2-ones of formula I wherein $R_1$ is hydroxy, m is 1 and G is a group —$CR_{18}R_{19}$—CO— obtained by that reaction can be derivatised according to generally known esterification and amidation methods, e.g. according to Organikum 1986, pages 402–410 with m-valent alcohols or with primary or secondary amines of formula

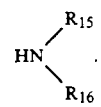

The phenols of formula (I) wherein $R_1$ is hydrogen, G is a direct bond and m=1 obtained by that reaction can be etherified according to generally known etherification methods, e.g. according to Organikum 1986, pages 194–200, for example by alkylation under basic conditions with an alkyl halide of formula $R_1^1Br$, a dialkyl sulfate of formula $(R_1^1)_2SO_4$ or an alkyl tosylate of formula

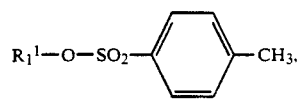

wherein $R_1^1$ has the same meaning as $R_1$ with the exception of hydrogen.

The phenols of formula (I) obtained by that reaction wherein $R_1$ is hydrogen and G is a direct bond can be esterified according to generally known esterifications methods, e.g. according to Organikum 1986, pages 402–408, for example by acylation with an acid chloride or acid anhydride of formula $R_1^1Cl$ or $R_1^1—O—R_1^1$ respectively wherein $R_1^1$ has the same meaning as $R_1$ with the exception of hydrogen.

The phenolic and amino anti-oxidants are either commercially available or can be prepared according to processes known per se.

In the polyol compositions according to the invention, the components B), C) and D) together are advantageously present in an amount of from 0.01 to 10, for example from 0.05 to 5, preferably from 0.05 to 3, but especially from 0.1 to 2% by weight. The ratios by weight of B:C, B:D and B:C:D can vary within wide limits and are advantageously from 10:1 to 1:10 or within the limits 10:1:1, 1:1:10 and 1:10:1, e.g. 5:1:1 (1:5:1, 1:1:5) or 2:1:1 (1:2:1, 1:1:2) respectively. It may also be advantageous to use the three components in approximately equimolar amounts.

The polyol compositions according to the invention are preferably used for the preparation of polyurethanes, especially polyurethane foams, with propellant advantageously being used.

In the preparation of polyurethanes it is therefore possible in addition to add as propellant water and/or readily volatile organic substances. Suitable organic propellants are, e.g., acetone, ethyl acetate, halo-substituted alkanes, such as methylene chloride, chloroform, ethylidene chloride, vinylidene chloride, monofluorotrichloromethane, chlorodifluoromethane, dichlorodifluoromethane, and also butane, hexane, heptane or diethyl ether. A propellant action can also be achieved by adding compounds that decompose at temperatures above room temperature to split off gases, for example nitrogen, e.g. azo compounds such as azoisobutyronitrile.

The process according to the invention for the preparation of polyurethanes is advantageously carried out in the presence of suitable catalysts. The catalysts used are catalysts that are known per se, such as e.g. tertiary amines, such as triethylamine, tributylamine, N-methylmorpholine, N-ethyl-morpholine, N-cocomorpholine, N,N,N',N'-tetramethylethylenediamine, 1,4-diazabicyclo-(2,2,2)-octane, N-methyl-N'-dimethylaminoethyl-piperazine, N,N-dimethylbenzylamine, bis(N,N-diethylaminoethyl) adipate, N,N-diethylbenzylamine, pentamethyldiethylenetriamine, N,N-dimethylcyclohexylamine, N,N,N',N'-tetramethyl-1,3-butanediamine, N,N-dimethyl-β-phenylethylamine, 1,2-dimethylimidazole and 2-methylimidazole, also Mannich bases known per se formed from secondary amines, such as dimethylamine, and aldehydes, preferably formaldehyde, or ketones, such as acetone, methyl ethyl ketone or cyclohexanone, and phenols, such as phenol, nonylphenol or bisphenol.

Examples of tertiary amines comprising hydrogen atoms active towards isocyanate groups that may be used as catalysts are triethanolamine, triisopropanolamine, N-methyldiethanolamine, N-ethyl-diethanolamine, N,N-dimethyl-ethanolamine, and reaction products thereof with alkylene oxides, such as propylene oxide and/or ethylene oxide.

Further suitable catalysts are silaamines having carbon-silicon bonds, such as 2,2,4-trimethyl-2-silamorpholine and 1,3-diethylaminomethyl-tetramethyl-disiloxane, and nitrogen-containing bases, such as tetraalkylammonium hydroxides, and alkali metal hydroxides, such as sodium hydroxide, alkali metal phenolates, such as sodium phenolate, or alkali metal alcoholates, such as sodium methoxide, or hexahydrotriazines, and organometallic compounds, especially organotin compounds, for example tin(II) salts of carboxylic acid, such as tin-(II) acetate, tin(II) octoate, tin(II) ethylhexoate and tin(II) laurate, and the tin(IV) compounds, for example dibutyltin oxide, dibutyltin dichloride, dibutyltin diacetate, dibutyltin dilaurate, dibutyltin maleate or dioctyltin diacetate. It is, of course, possible for all of the above-mentioned catalysts to be used in the form of mixtures.

Other additives known per se, for example surface-active additives, such as emulsifiers and foam stabilisers, are optionally also present.

Examples of suitable emulsifiers are the sodium salts of ricinoleic sulfonates or salts of fatty acids with amines, such as diethylamine oleate or diethanolamine stearate. Alkali metal or ammonium salts of sulfonic acids, for example of dodecylbenzenesulfonic acid or dinaphthylmethanedisulfonic acid, or of fatty acids, such as ricinoleic acid, or of polymeric fatty acids, may also be used as surface-active additives.

Suitable foam stabilisers are especially polyether siloxanes, especially water-soluble representatives thereof. The structure of those compounds is generally such that a copolymer of ethylene oxide and propylene oxide is bonded to a polydimethylsiloxane radical.

Further additives that may also be present in the compositions are reaction retardants, for example substances with an acid reaction, such as hydrochloric acid or organic acid halides, also cell regulators of the type known per se, such as paraffins or fatty alcohols, or dimethylpolysiloxanes and pigments or dyes and flame-retardants of the type known per se, for example tris-chloroethyl phosphate, tricresyl phosphate or ammonium phosphate and polyphosphate, and stabilisers that counteract the effects of ageing and weathering, plasticisers and fungistats and bacteriostats, as well as fillers, such as barium sulfate, diatomaceous earth, carbon black or prepared chalk.

Further examples of surface-active additives and foam stabilisers as well as cell regulators, reaction retardants, stabilisers, flame-retardants, plasticisers, dyes and fillers and also fungistats and bacteriostats that are optionally present and details of the method of use and mode of action of those additives are well known to a person skilled in the art.

Using the process according to the invention, it is possible to prepare polyurethane substances in any desired form, such as articles of any desired form and also fibres. Preference is given, however, to the preparation of foams, it being possible, by suitable selection of the components, to obtain either flexible or rigid foams or any products between those extremes.

Polyurethane foams are preferably prepared from liquid starting components, with either the starting materials to be reacted with one another being mixed together in a one-shot process, or a preadduct containing NCO groups that is formed from a polyol and an excess of polyisocyanate being prepared first and then foamed, for example by reaction with water.

According to the invention, the reaction components are reacted in accordance with the one-shot process known per se, the prepolymer process or the semi-prepolymer process, mechanical devices that are well known to a person skilled in the art often being used.

In the preparation of foams, the foaming is often carried out in moulds. In that case, the reaction mixture is introduced into a mould. Suitable mould materials are metals, for example aluminium, or plastics, for example epoxy resin. In the mould the foamable reaction mixture foams up and forms the moulded article. The formation of foam using a mould can be carried out in such a manner that the moulding has a cellular surface structure, or alternatively, it can be carried out in such a manner that the moulding has a dense skin and a cellular core. In this connection, it is possible to introduce into the mould an amount of foamable reaction mixture sufficient for the foam that forms to fill the mould exactly. It is, however, also possible to introduce more foamable reaction mixture into the mould than is required to fill the interior of the mould with foam. In the last-mentioned case, therefore, the operation is carried out with "overcharging".

In the case of foam formation in a mould "external release agents" known per se, such as silicone oils, are often used concomitantly. It is, however, also possible to use so-called "internal release agents", optionally in admixture with external release agents.

It is also possible according to the invention to use cold-hardening foams. The foams can, of course, alternatively be prepared by means of block foaming or by means of the double conveyor belt process which is known per se.

The process according to the invention can be used to prepare flexible, semi-flexible or hard polyurethane foams. The foams have the uses known per se for such products, for example as mattresses and upholstery in the furniture and automobile industries, and also for the manufacture of fittings, such as are used in the automobile industry, and finally as sound-insulating compositions and as compositions for heat-insulation and low-temperature insulation, for example in the construction sector or in the refrigeration industry, or in the textile industry, for example as shoulder pads.

The following Examples further illustrate the invention but without implying any limitation. Unless indicated otherwise, parts and percentages relate, as in the remainder of the description, to weight.

The components contained in the stabiliser mixtures used are listed in the following together with their abbreviations:

Benzofuranone components:

B1:

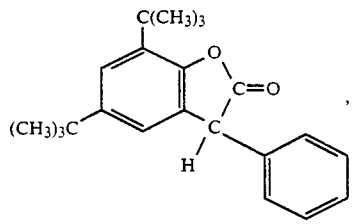

B2:

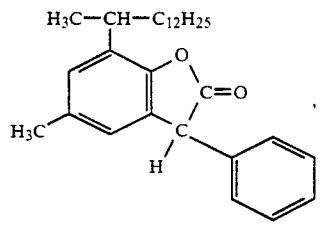

B3:

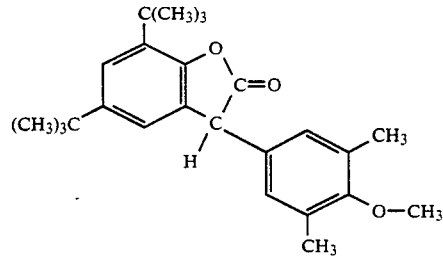

B4:

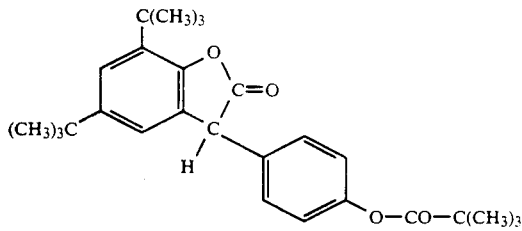

B5:

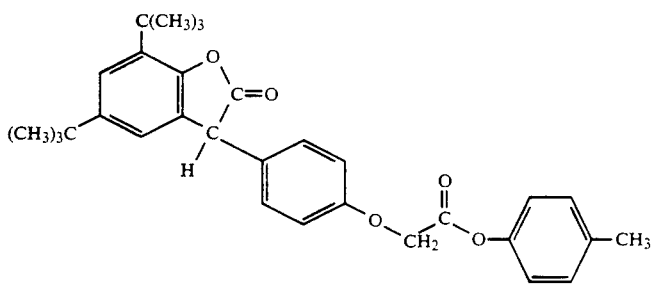

Amino anti-oxidants:

A1: Commercial mixture, obtained by reaction of diphenylamine with diisobutylene, comprising
 a) 3% diphenylamine;
 b) 14% 4-tert-butyldiphenylamine;
 c) 30% compounds from the group
  i) 4-tert-octyldiphenylamine,
  ii) 4,4'-di-tert-butyldiphenylamine,
  iii) 2,4,4'-tris-tert-butyldiphenylamine,
 d) 29% compounds from the group
  i) 4-tert-butyl-4'-tert-octyldiphenylamine,
  ii) o,o'-, m,m'-, or p,p'-di-tert-octyldiphenylamine,
  iii) 2,4-di-tert-butyl-4'-tert-octyldiphenylamine,
 e) 24% compounds from the group
  i) 4,4'-di-tert-octyldiphenylamine (18%),
  ii) 2,4-di-tert-octyl-4'-tert-butyldiphenylamine (6%),

A2:

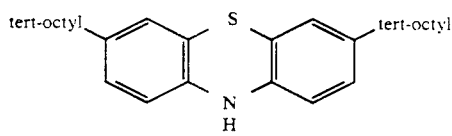

Phenolic anti-oxidants:

P1:

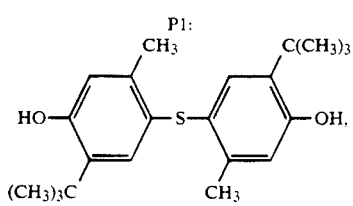

P2:

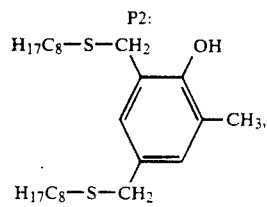

P3:

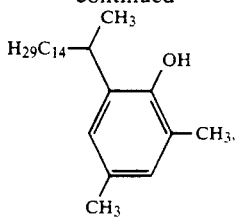

P4:

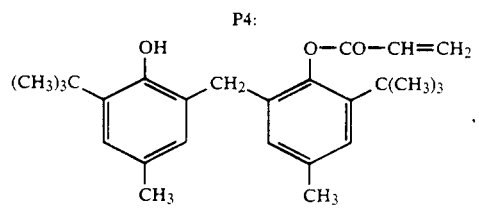

P5:

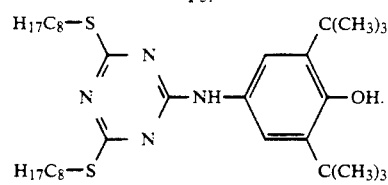

EXAMPLES 1-14

Soft polyether/polyurethane foams and the stabilisation thereof

Exactly 470 mg (0.3%, based on the polyol) of a stabiliser mixture according to the invention (see numbered Examples, Tables 1, 2 and 4) are dissolved in 157 g of an antioxidant-free polyether polyol, ®Lupranol 2045 (trifunctional polyether polyol having primary hydroxy groups; hydroxy number 35 mg KOH/g, water content less than 0.1%, acid number less than 0.1 mg KOH/g).

TABLE 4

| Ex. No. | Stabiliser mixture | Conc. in % based on polyol |
|---|---|---|
| 0 | — | — |

TABLE 4-continued

| Ex. No. | Stabiliser mixture | Conc. in % based on polyol |
|---|---|---|
| 21 | B3/P2/A1 | 0.1/0.1/0.1 |
| 22 | B4/P2/A1 | 0.1/0.1/0.1 |
| 23 | B5/P2/A1 | 0.1/0.1/0.1 |

10.24 g of a solution of 1.74 g of ®TECOSTAB [polysilicone produced by Goldschmidt, DE], 0.48 g of diazabicyclooctane [amine catalysts] and 0.8 g of water are added thereto and the reaction mixture is stirred intensively at 100 rpm for 60 seconds.

3.2 g of a solution of 0.32 g of tin octoate (catalyst) in 2.9 g of the above polyol are then added thereto and the reaction mixture is again stirred intensively for 60 sec. at 100 rpm. Immediately, while stirring intensively, 98 g of an isocyanate (®Lupranat T80 produced by BASF; tolylene-2,4- and -2,6-diisocyanate mixture) are added thereto and after 6 sec. the reaction mixture is poured into a lined mould and the exothermic temperature is measured during foaming to form a foam block.

The foam blocks are cooled for 24 hours in a climatic chamber at 5° C. and stored. Slices 2 cm thick are sawed from the middle of the blocks and round (cylindrical) test samples are cut therefrom using a boring tool. The samples are aged in a test tube in the presence of air at 190° C. in a preheated alu-block thermostat.

The yellowing of those samples is determined as the Yellowness Index (YI) in accordance with ASTM D-1925.

The resistance of the stabilised polyurethane foam to oxidation is determined by measuring the DSC value (differential scanning calorimetry, temperature-controlled calorimetry). For that purpose, 20 mg of the sample are weighed into an aluminum crucible and heated from a starting temperature of 50° C. at a rate of 5° C./min. The beginning of the exothermic oxidation is determined calorimetrically by means of a temperature-controlled measurement against an unstabilised reference substance. The temperature at which oxidation begins, and the temperature difference ($\Delta T$) between the temperature measured for the respective stabilised samples and the corresponding temperature of the unstabilised polyol are given. High values denote a high degree of resistance to oxidation. The results are summarised in Tables 1 and 2 below.

TABLE 1

| Ex. No. | Stabiliser mixture | Concentration in %, based on polyol | YI after oven ageing: | | | | | | | | | Oxidation resistance acc. to DSC method | |
|---|---|---|---|---|---|---|---|---|---|---|---|---|---|
| | | | 0 | 10 | 20 | 30 | 40 | 60 | 80 | 100 | 120 (Min.) | T (°C.) | $\Delta T$ |
| 0 | — | — | −0.7 | 44 | 48 | 55 | 57 | 62 | | | | 171 | 0 |
| 1 | B1/P2 | 0.2/0.1 | 1.1 | 2.7 | 2.9 | 4.8 | 7.2 | 42 | 53 | | | 198 | 27 |
| 2 | B1/P5 | 0.2/0.1 | 0.3 | 2.1 | 2.6 | 3.7 | 4.6 | 7.9 | 16 | 23 | 33 | 205 | 34 |
| 3 | B1/P1 | 0.2/0.1 | 1.1 | 2.3 | 2.9 | 3.3 | 4.1 | 5.6 | 6.7 | 19 | 28 | 208 | 37 |
| 4 | B1/A1 | 0.2/0.1 | 1.1 | 2.2 | 2.4 | 3.5 | 4.2 | 6.5 | 12 | 19 | 26 | 210 | 35 |
| 5 | B1/P3 | 0.2/0.1 | 0 | 1.5 | 1.8 | 2.9 | 3.3 | 22 | 26 | 33 | 41 | 200 | 29 |
| 6 | B1/P2/P1 | 0.1/0.1/0.1 | −0.5 | 0.8 | 1.2 | 1.9 | 2.1 | 3.8 | 4.2 | 9.4 | 13 | 205 | 34 |
| 7 | B1/P2/P5 | 0.1/0.1/0.1 | −0.6 | 1.0 | 1.4 | 2.3 | 3.1 | 5.5 | 10 | 24 | 31 | 208 | 37 |
| 8 | B1/P2/A1 | 0.1/0.1/0.1 | −0.2 | 0.8 | 1.3 | 2.2 | 2.8 | 3.6 | 5.3 | 9.2 | 13 | 211 | 40 |
| 9 | B1/P2/P1/A1 | 0.05 each | −0.5 | 0.7 | 1.2 | 1.7 | 2.4 | 4.2 | 5.7 | 11 | 21 | 206 | 35 |

TABLE 2

| Ex. No. | Stabiliser mixture | Concentration in %, based on polyol | YI after oven ageing: | | | | | | | | | Oxidation resistance acc. to DSC method | |
|---|---|---|---|---|---|---|---|---|---|---|---|---|---|
| | | | 0 | 20 | 30 | 40 | 60 | 80 | 100 | 120 | 140 | 160 | T (°C.) | $\Delta T$ |
| 0 | — | — | −0.7 | 48 | 55 | 57 | 62 | | | | | | 175 | 0 |
| 10 | B2/A2 | 0.25/0.05 | 1.9 | 2.4 | 4.1 | 6.5 | 11 | 16 | 22 | 24 | 31 | 33 | 220 | 45 |
| 11 | B2/P2 | 0.25/0.05 | −1.6 | 2.1 | 4.4 | 5.9 | 11 | 23 | 34 | 39 | 46 | 53 | 194 | 19 |
| 12 | B2/P1 | 0.25/0.05 | −1.8 | 1.7 | 2.6 | 3.7 | 5.1 | 10 | 20 | 24 | 36 | 39 | 208 | 33 |
| 13 | B2/A1 | 0.25/0.05 | −1.7 | 1.8 | 3.1 | 5.9 | 7.3 | 12 | 21 | 27 | 35 | 38 | 208 | 33 |
| 14 | B2/P5 | 0.25/0.05 | −1.7 | 1.9 | 3.5 | 4.7 | 7.5 | 13 | 23 | 31 | 39 | 43 | 202 | 27 |

The action of the stabiliser combinations according to the invention is excellent. The yellowing remains low for a long time (low Yellowness Index values denote a low degree of yellowing)

EXAMPLES 15-20

With the DSC method described above, the resistance to oxidation of the polyether polyols themselves is also measured. The oxidation time indicated in each case is the time that has passed until the exothermic reaction commences, that is to say long times denote good stabilisation.

The results are illustrated in the following Table 3.

TABLE 3

| Example No. | Component | Concentration [ppm] | Oxidation time [min] |
|---|---|---|---|
| 00 | — | — | 0 |
| 15 | B1 | 2000 | 315 |
| | P1 | 1000 | |
| 16 | B1 | 1000 | 346 |
| | P1 | 1000 | |
| | P2 | 1000 | |
| 17 | B1 | 2000 | 272 |
| | P5 | 1000 | |
| 18 | B1 | 2000 | 179 |
| | A1 | 1000 | |
| 19 | B1 | 1000 | 236 |
| | A1 | 1000 | |
| | P2 | 1000 | |
| 20 | B1 | 500 | 300 |
| | P2 | 500 | |
| | P1 | 500 | |
| | A1 | 500 | |

The compositions according to the invention are shown to have a high degree of stability.

What is claimed is:

1. A composition comprising
   A) a polyether polyol or mixtures of such polyols,
   B) at least one benzofuranone derivative of formula I

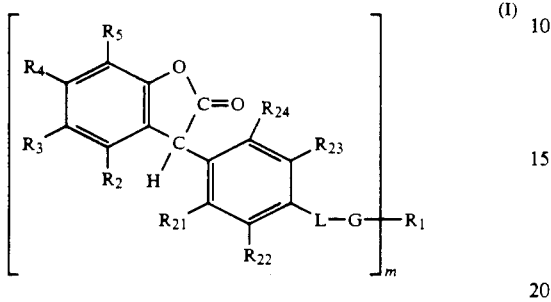

wherein

L is oxygen or, when G is a direct bond and $R_1$ is hydrogen, $C_1-C_4$alkyl or $C_1-C_4$alkoxy, does not exist, G is a direct bond or a group $-CR_{18}R_{19}-CO-$, m is 1 or 2, $R_1$, when m=1 and G is a direct bond, is hydrogen, $C_1-C_{25}$alkyl, $C_3-C_{25}$alkenyl, $C_2-C_{18}$alkanoyl, $C_3-C_{25}$alkenoyl, $C_7-C_9$phenylalkyl, unsubstituted or $C_1-C_4$alkyl-substituted phenyl, unsubstituted or $C_1-C_4$alkyl-substituted $C_5-C_8$cycloalkyl, $C_3-C_{25}$-alkyl, -alkanoyl or -alkenyl interrupted by oxygen, sulfur or by $>NR_{16}$, $C_6-C_9$-cycloalkoxycarbonyl, benzoyl or $C_1-C_{12}$alkyl-substituted benzoyl, or $R_1$, when m=2 and G is a direct bond, is $-CO-R_{17}-CO-$, or $R_1$, when m=1 and G is a group $-CR_{18}R_{19}-CO-$, is hydroxy, $C_1-C_{30}$alkoxy, $C_3-C_{30}$alkoxy interrupted by oxygen, sulfur or by $>NR_{13}$, $C_7-C_9$-phenylalkoxy, $C_5-C_{12}$cycloalkoxy, $C_2-C_{18}$alkenyloxy, unsubstituted or $C_1-C_{12}$alkyl-substituted phenoxy,

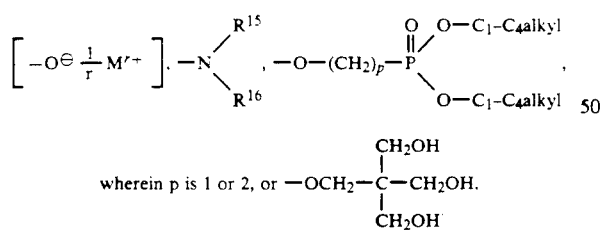

wherein p is 1 or 2, or $-OCH_2-\underset{\underset{CH_2OH}{|}}{\overset{\overset{CH_2OH}{|}}{C}}-CH_2OH.$ or $R_1$, when m=2 and G is a group $-CR_{18}R_{19}-CO-$, is $C_2-C_{12}$alkanedioxy, $C_3-C_{25}$alkanedioxy interrupted by oxygen, sulfur or by $>NR_{16}$,

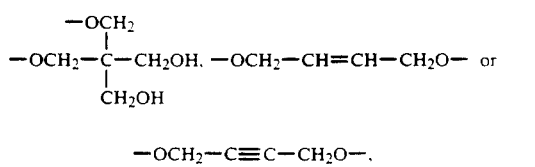

$R_2$ and $R_4$ are each, independently of the other, hydrogen or $C_1-C_6$alkyl, $R_3$ and $R_5$ are each, independently of the other, hydrogen, $C_1-C_{25}$alkyl, $C_7-C_9$phenylalkyl, unsubstituted or $C_1-C_4$alkyl-substituted phenyl, unsubstituted or $C_1-C_4$alkyl-substituted $C_5-C_8$cycloalkyl, $C_1-C_{18}$alkoxy, hydroxy, $C_1-C_{25}$alkanoyloxy, $C_3-C_{25}$alkenoyloxy, $C_3-C_{25}$alkenyloxy interrupted by oxygen, sulfur or by $>NR_{16}$, $C_6-C_9$cycloalkylcarbonyloxy, benzoyloxy or $C_1-C_{12}$alkyl-substituted benzoyloxy, or a radical of the formula $-(CH_2)_n-CO-OR_6$, $-(CH_2)_n-COR_{11}$ or $-(CH_2)_n-CO-N(R_7)_2$, $R_3$, when m=1, is furthermore a radical of the formula

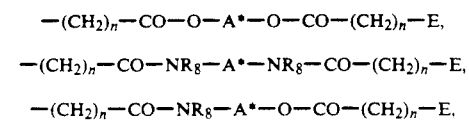

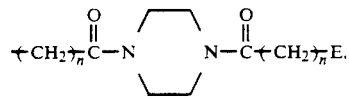

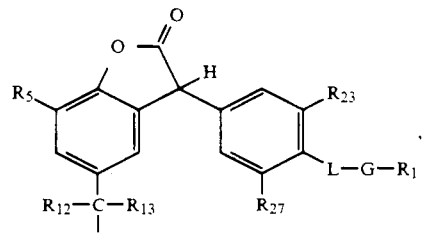

$-CH_2-S-R_9$, $-CH(C_6H_5)-CO-R_6$ or when m=1 and $R_4$, $R_5$, $R_{21}$ $R_{24}$ are hydrogen, $R_3$ in addition is a radical of the formula

[structure with $R_5$, $R_{12}-C-R_{13}$, $R_{23}$, $R_{27}$, $L-G-R_1$]

$R_2$ together with $R_3$ or $R_4$ together with $R_5$, in each case together with the carbon atoms to which they are bonded, form a phenyl ring, $R_6$ is hydrogen, $C_2-C_{18}$alkyl, $C_1-C_{18}$alkyl interrupted by oxygen or by sulfur, $C_3-C_{16}$dialkylaminoalkyl, cyclohexyl, phenyl, or phenyl substituted by from 1 to 3 alkyl radicals together having a maximum of 18 carbon atoms, n is 0, 1 or 2, the substituents $R_7$ are each, independently of the other, hydrogen, $C_1-C_{18}$alkyl, cyclopentyl, cyclohexyl, phenyl, phenyl substituted by 1 or 2 alkyl radicals together having a maximum of 16 carbon atoms, a radical of the formula $-C_2H_4OH$, $-C_2H_4-O-C_qH_{2q+1}$ or $-C_2H_4-O-CO-R_{10}$, together with the nitrogen atom to which they are bonded, form a piperidine or morpholine radical, wherein q is 1 to 18, $R_8$ is hydrogen, alkyl having from 1 to 18 carbon atoms, cyclopentyl, cyclohexyl, phenyl, benzyl, phenyl substituted by 1 or 2 alkyl radicals together having a maximum of 16 carbon atoms, or benzyl, $R_9$ is alkyl having from 1 to 18 carbon atoms, R$_{10}$ is hydrogen, alkyl having from 1 to 22 carbon atoms or cycloalkyl having from 5 to 12 carbon atoms R$_{11}$ is hydroxy,

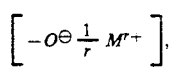

C$_1$-C$_{18}$alkoxy or —NR$_{14}$R$_{15}$,

R$_{12}$ and R$_{13}$ are each, independently of the other, hydrogen, C$_1$-C$_{12}$alkyl or phenyl, or form together with the C-atom to which they are bound a C$_5$-C$_7$-alkylidene-ring which is unsubstituted or substituted by 1 to 3 C$_1$-C$_4$alkyl groups, R$_{14}$ and R$_{15}$ are each, independently of the other, hydrogen or C$_1$-C$_{18}$alkyl, M is an r-valent metal cation and r is 1, 2 or 3, A* is an alkylene radical having from 2 to 22 carbon atoms that may or may not be interrupted by nitrogen, oxygen or by sulfur, Y is —O—, —S—, —SO—, —SO$_2$— or —C(R$_{20}$)$_2$—, wherein the substituents R$_{20}$ are each, independently of the other, hydrogen, C$_1$-C$_{16}$alkyl, phenyl or a radical of the formula —(CH$_2$)$_n$—CO—OR$_6$ or —(CH$_2$)$_n$—CO—N(R$_7$)$_2$, E is a radical of the formula

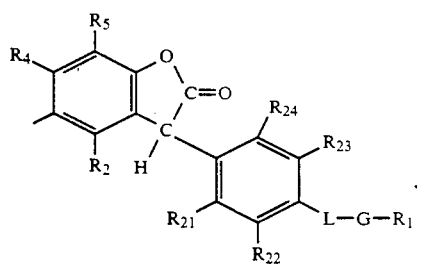

R$_{16}$ is hydrogen or C$_1$-C$_8$alkyl,

R$_{17}$ is a direct bond, C$_1$-C$_{18}$alkylene, C$_2$-C$_{18}$alkylene interrupted by oxygen, sulfur or by >NR$_{16}$, C$_2$-C$_{18}$alkenylene, C$_2$-C$_{20}$alkylidene, C$_7$-C$_{20}$-phenylalkylidene, C$_5$-C$_8$cycloalkylene, C$_7$-C$_8$-bicycloalkylene or phenylene, R$_{18}$ and R$_{19}$ are each, independently of the other, hydrogen, C$_1$-C$_4$alkyl or phenyl, and R$_{21}$, R$_{22}$, R$_{23}$ R$_{24}$ are each, independently of the others, hydrogen, C$_1$-C$_4$alkyl or C$_1$-C$_4$alkoxy, provided that at least one of the radicals R$_{21}$, R$_{22}$, R$_{23}$ and R$_{24}$ is hydrogen, C) at least one compound from the group of the phenolic anti-oxidants, and D) at least one compound of formula III

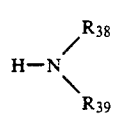

wherein

R$_{38}$ is C$_1$-C$_{18}$alkyl, phenyl-C$_1$-C$_4$alkyl, C$_5$-C$_{12}$cycloalkyl, phenyl, naphthyl, or phenyl or naphthyl substituted by C$_1$-C$_{12}$alkyl or by C$_1$-C$_{12}$alkoxy, R$_{39}$ is phenyl, naphthyl, or phenyl or naphthyl substituted by C$_1$-C$_{12}$alkyl or by C$_1$-C$_{12}$alkoxy, or R$_{38}$ and R$_{39}$ together form a radical of the formula IV

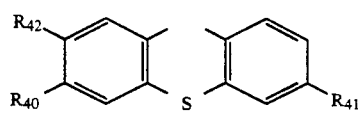

wherein

R$_{40}$ and R$_{41}$ are hydrogen or C$_1$-C$_{18}$alkyl or

R$_{41}$ is hydrogen or C$_1$-C$_{18}$alkyl and

R$_{40}$ together with R$_{42}$ forms a group of the formula

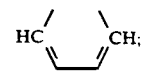

or, a composition comprising (A), (B) and (D).

2. A composition according to claim 1, comprising

B) at least one benzofuranone derivative of formula Ia

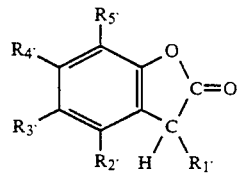

wherein

R*$_1$ is phenyl, or phenyl substituted by from 1 to 3 alkyl radicals together having a maximum of 12 carbon atoms or by alkoxy having from 1 to 12 carbon atoms, R*$_2$ is hydrogen and R*$_4$ is hydrogen, alkyl having from 1 to 12 carbon atoms, cyclopentyl, cyclohexyl or chlorine, R*$_3$ has the same meaning as R*$_2$ or R*$_4$ or is a radical of the formula —(CH$_2$)$_n$—CO—OR*$_6$, —(CH$_2$)$_n$—CO—N(R*$_7$)$_2$, —(CH$_2$)$_n$—CO—O—A*—O—CO—(CH$_2$)$_n$—E*, —(CH$_2$)$_n$—CO—NR*$_8$—A*—N-R*$_8$—CO—(CH$_2$)$_n$—E*, —(CH$_2$)$_n$—CO—N-R*$_8$—A*—O—CO—(CH$_2$)$_n$—E*,

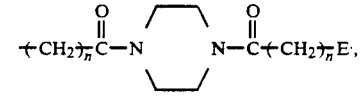

—CH$_2$—S—R*$_9$, —CH(C$_6$H$_5$)—CO—R*$_6$ or —Y*—E* wherein

R*$_6$ is hydrogen, alkyl having from 2 to 18 carbon atoms, alkyl having from 1 to 18 carbon atoms that is interrupted by oxygen or by sulfur, dialkylaminoalkyl having a total of from 3 to 16 carbon atoms, cyclopentyl, cyclohexyl, phenyl, or phenyl substituted by from 1 to 3 alkyl radicals together having a maximum of 18 carbon atoms, n is 0, 1 or 2, the substituents R*₇ are each, independently of the other, hydrogen, alkyl having from 1 to 18 carbon atoms, cyclopentyl, cyclohexyl, phenyl, phenyl substituted by 1 or 2 alkyl radicals together having a maximum of 16 carbon atoms, a radical of the formula —C₂H₄OH, —C₂H₄—O—C$_q$H$_{2q+1}$ or —C₂H₄—O—CO—R*₁₀, or, together with the nitrogen atom to which they are bonded, form a piperidine or morpholine radical, q is from 1 to 18, R*₁₀ is hydrogen, alkyl having from 1 to 22 carbon atoms or cycloalkyl having from 5 to 12 carbon atoms, A* is an alkylene radical having from 2 to 22 carbon atoms that may or may not be interupted by nitrogen, oxygen or by sulfur, R*₈ is hydrogen, alkyl having from 1 to 18 carbon atoms, cyclopentyl, cyclohexyl, phenyl, phenyl substituted by 1 or 2 alkyl radicals together having a maximum of 16 carbon atoms, or benzyl, R*₉ is alkyl having from 1 to 18 carbon atoms, Y* is —O—, —S—, —SO—, —SO₂— or —C(R*₁₁)₂—, the substituents R*₁₁, are each, independently of the other, hydrogen, alkyl wherein the alkyl radicals together have a maximum of 16 carbon atoms, phenyl or a radical of the formula —(CH₂)$_n$—CO—OR*₆ or —(CH₂)$_n$—CO—N(R*₇)₂ wherein n, R*₆ and R*₇ have the meanings given, E* is a radical of the formula

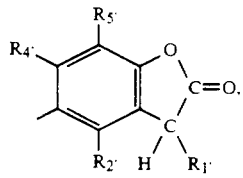

wherein R*₁, R*₂ and R*₄ have the meanings given, and R*₅ is hydrogen, alkyl having from 1 to 20 carbon atoms, cyclopentyl, cyclohexyl, chlorine or a radical of the formula —(CH₂)$_n$—CO—OR*₆ or —(CH₂)$_n$—CO—N(R*₇)₂ wherein R₆* and R₇* have the meanings given, or R₅* together with R₄* forms a tetramethylene radical.

3. A composition according to claim 1, wherein component C) corresponds to formula II

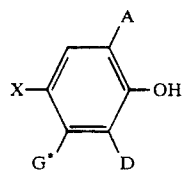

(II)

wherein
A is hydrogen, C₁-C₂₄alkyl, C₅-C₁₂cycloalkyl, phenyl-C₁-C₄alkyl, phenyl or a group —CH₂—S—R₂₅ or

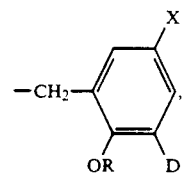

D is C₁-C₂₄alkyl, C₅-C₁₂cycloalkyl, phenyl-C₁-C₄alkyl, phenyl or a group —CH₂—S—R₂₅, X is hydrogen, C₁-C₁₈alkyl or one of the groups —C$_a$H$_{2a}$—S$_q$—R₂₆, —C$_b$H$_{2b}$—CO—OR₂₇, —C$_b$H$_{2b}$—CO—N(R₂₉)(R₃₀), —CH₂N(R₃₄)(R₃₅),

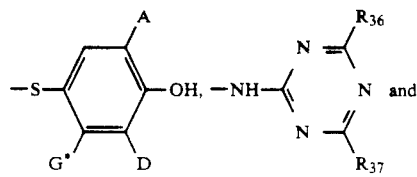

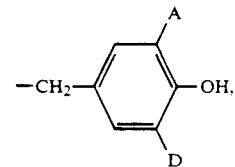

R is hydrogen or a group of the formula —CO—CH=CH₂,

G* is hydrogen or C₁-C₁₂alkyl,

R₂₅ is C₁-C₁₈alkyl, phenyl or a group —(CH₂)$_c$—CO—OR₂₈ or —CH₂CH₂OR₃₃,

R₂₆ is hydrogen, C₁-C₁₈alkyl, phenyl, benzyl or a group

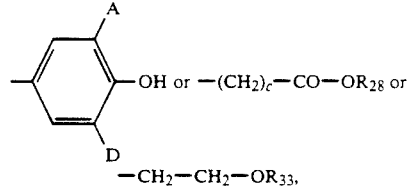

R₂₇ is C₁-C₃₀alkyl or one of the groups —CHR₃₁—CH₂—S—R₃₂,

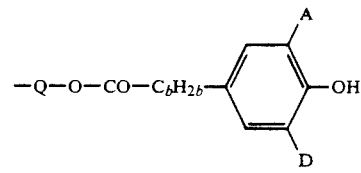

and

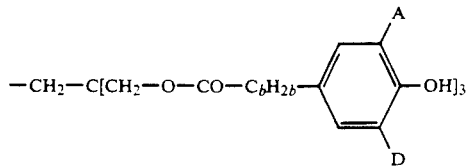

wherein Q is C₂-C₈alkylene, C₄-C₆thiaalkylene or a group —CH₂CH₂(OCH₂CH₂)$_d$—, $R_{28}$ is $C_1$-$C_{24}$alkyl, $R_{29}$ is hydrogen, $C_1$-$C_{18}$alkyl or cyclohexyl, $R_{30}$ is $C_1$-$C_{18}$alkyl, cyclohexyl, phenyl, phenyl substituted by $C_1$-$C_{18}$alkyl, or one of the groups

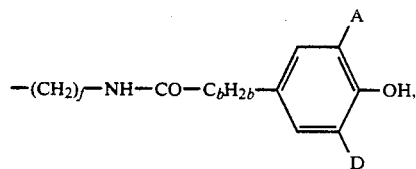

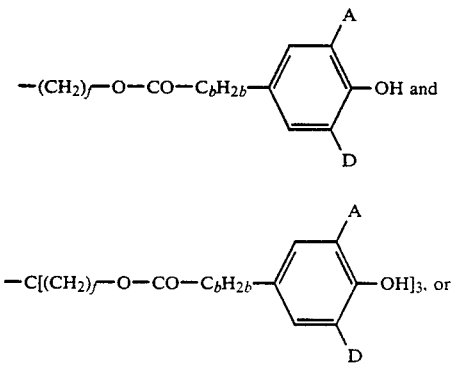

$R_{29}$ and $R_{30}$ together are $C_4$-$C_8$alkylene that may be interrupted by —O— or —NH—, $R_{31}$ is hydrogen, $C_1$-$C_4$alkyl or phenyl, $R_{32}$ is $C_1$-$C_{18}$alkyl, $R_{33}$ is hydrogen, $C_1$-$C_{24}$alkyl, phenyl, $C_2$-$C_{18}$alkanoyl or benzoyl, $R_{34}$ is $C_1$-$C_{18}$alkyl, cyclohexyl, phenyl, phenyl substituted by $C_1$-$C_{18}$alkyl, or a group

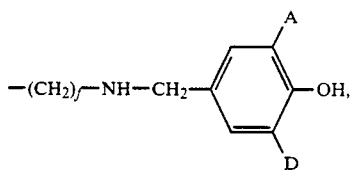

$R_{35}$ is hydrogen, $C_1$-$C_{18}$alkyl, cyclohexyl, or a group

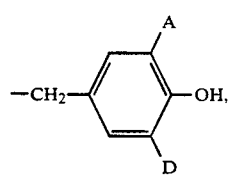

$R_{34}$ and $R_{35}$ together are $C_4$-$C_8$alkylene, which may be interrupted by —O— or —NH—, $R_{36}$ and $R_{37}$ are —S—$C_1$-$C_{18}$alkyl, a is 0, 1, 2 or 3, b is 0, 1, 2 or 3, c is 1 or 2, d is from 1 to 5, f is from 2 to 8 and q is 1, 2, 3 or 4.

4. A composition according to claim 3, wherein

A is hydrogen, $C_1$-$C_8$alkyl, cyclohexyl, phenyl or a group —CH$_2$—R$_{36}$ or

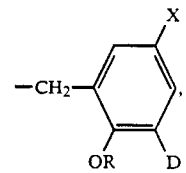

D is $C_1$-$C_8$alkyl, cyclohexyl, phenyl or a group —CH$_2$—R$_{37}$,

X is hydrogen, $C_1$-$C_8$alkyl or one of the groups —C$_a$H$_{2a}$—S$_q$—R$_{26}$, —C$_b$H$_{2b}$—CO—OR$_{27}$, —CH$_2$N(R$_{34}$)(R$_{35}$),

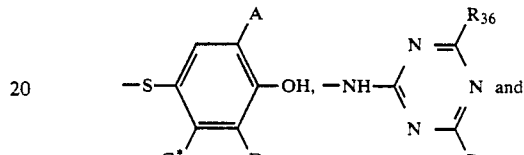

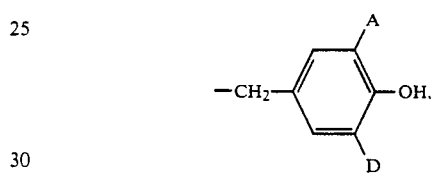

$R_{26}$ is $C_1$-$C_{12}$alkyl, phenyl or a group —(CH$_2$)$_c$—CO—OR$_{28}$, $R_{27}$ is $C_1$-$C_{18}$alkyl or a group

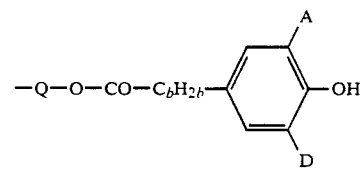

wherein Q is $C_2$-$C_8$alkylene, —CH$_2$—CH$_2$—S—CH$_2$CH$_2$ or a group —CH$_2$CH$_2$(OCH$_2$CH$_2$)$_d$—, $R_{28}$ is $C_1$-$C_{18}$alkyl, $R_{34}$ and $R_{35}$ are each, independently of the other, hydrogen or $C_1$-$C_{12}$alkyl or $R_{34}$ and $R_{35}$ together are $C_4$-$C_8$alkylene which may be interrupted by —O— or —NH—, a is 1 or 2, b is 1 or 2, c is 1 or 2, and d is 1, 2 or 3.

5. A composition according to claim 4, wherein

A is hydrogen, $C_1$-$C_6$alkyl, —CH$_2$—R$_{36}$ or a group

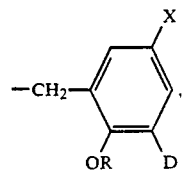

D is hydrogen or $C_1$-$C_{18}$alkyl, and

X is hydrogen, $C_1$-$C_4$alkyl, —CH$_2$—R$_{36}$ or a group of the formula

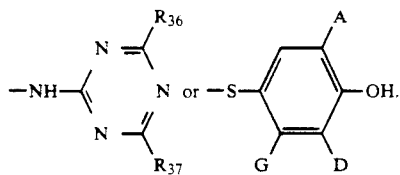

6. A composition according to claim 1, wherein $R_{38}$ and $R_{39}$ are each, independently of the other, phenyl or phenyl substituted by $C_1$–$C_{12}$alkyl, or together form a radical of the formula IV.

7. A composition according to claim 1 wherein $R_{38}$ and $R_{39}$ form a radical of the formula IV wherein $R_{40}$ and $R_{41}$ are $C_6$–$C_{12}$alkyl and $R_{42}$ is hydrogen,
or component D) is a commercial mixture obtained by reacting diphenylamine with diisobutylene, comprising
  a) diphenylamine;
  b) 4-tert-butyldiphenylamine;
  c) compounds from the group
    i) 4-tert-octyldiphenylamine,
    ii) 4,4′-di-tert-butyldiphenylamine,
    iii) 2,4,4′-tris-tert-butyldiphenylamine,
  d) compounds from the group
    i) 4-tert-butyl-4′-tert-octyldiphenylamine,
    ii) o,o′-,m,m′-, or p,p′-di-tert-octyldiphenylamine,
    iii) 2,4-di-tert-butyl-4′-tert-octyldiphenylamine,
  e) compounds from the group
    i) 4,4′-di-tert-octyldiphenylamine,
    ii) 2,4,-di-tert-octyl-4′-tert-butyldiphenylamine,
  and wherein not more than 5% of component a), 8 to 15% b), 24 to 32% c), 23 to 34% d) and 21 to 34% e) are present.

8. A composition according to claim 1, wherein $R_2$ is hydrogen.

9. A composition according to claim 1, wherein
  $R_1$, when m=1 and G is a direct bond, is hydrogen, $C_1$–$C_{18}$alkyl, $C_3$–$C_{18}$alkenyl, $C_2$–$C_{18}$alkanoyl, $C_3$–$C_{18}$alkenoyl, benzyl, phenyl or $C_1$–$C_4$alkyl-substituted phenyl, $C_5$–$C_8$cycloalkyl, $C_3$–$C_{18}$-alkyl, -alkanoyl or -alkenyl interrupted by oxygen, sulfur or by $>NR_{16}$, $C_6$–$C_9$cycloalkoxycarbonyl, benzoyl, or $C_1$–$C_8$alkyl-substituted benzoyl, or
  $R_1$, when m=2 and G is a direct bond, is —CO—$R_{17}$—CO—, or
  $R_1$, when m=1 and G is a group —$CR_{18}R_{19}$—CO—, is hydroxy, $C_1$–$C_{18}$alkoxy, $C_3$–$C_{18}$alkoxy interrupted by oxygen, sulfur or by $>NR_{13}$, benzyloxy, $C_5$–$C_8$cycloalkoxy, unsubstituted or $C_1$–$C_8$alkyl-substituted phenoxy, -$NR_{14}R_{15}$ or

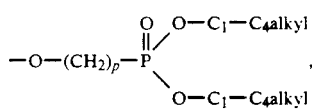

or
  $R_1$, when m=2 and G is a group —$CR_{18}R_{19}$—CO—, is $C_2$–$C_{12}$alkanedioxy, or $C_3$–$C_{25}$alkanedioxy interrupted by oxygen,
  $R_2$ and $R_4$ are hydrogen, $R_3$ and $R_5$ are each, independently of the other, hydrogen, $C_1$–$C_{18}$alkyl, $C_7$–$C_9$phenylalkyl, benzyl, phenyl, $C_5$–$C_8$cycloalkyl, $C_1$–$C_8$alkoxy, hydroxy, $C_1$–$C_{18}$alkanoyloxy, $C_3$–$C_{18}$alkenoyloxy or benzoyloxy, or a radical of the formula —(CH$_2$)$_n$—CO—OR$_6$ or —(CH$_2$)$_n$—CO—N(R$_7$)$_2$, and
$R_3$, when m=1, is in addition a radical of the formula —Y—E,
$R_{17}$ is a direct bond, $C_1$–$C_{12}$alkylene, $C_2$–$C_{12}$alkylene interrupted by oxygen, sulfur or by $>NR_{16}$, $C_2$–$C_{12}$alkenylene, $C_2$–$C_{12}$alkylidene, $C_7$–$C_{12}$phenylalkylidene, $C_5$–$C_8$cycloalkylene or phenylene.

10. A composition according to claim 9, wherein m=1 and,
  $R_1$, when G is a direct bond, is hydrogen, $C_1$–$C_{18}$alkyl, $C_2$–$C_{18}$alkanoyl, $C_3$–$C_4$alkenyl, $C_3$–$C_{18}$alkenoyl, benzyl, $C_5$–$C_8$cycloalkyl, or $C_3$–$C_{18}$alkyl or -alkanoyl interrupted by oxygen, or
  $R_1$, when G is a group —$CR_{18}R_{19}$—CO—, is hydroxy, $C_1$–$C_{18}$alkoxy, $C_3$–$C_{18}$alkoxy interrupted by oxygen, unsubstituted or $C_1$–$C_8$alkyl-substituted phenoxy, —$NR_{14}R_{15}$ or

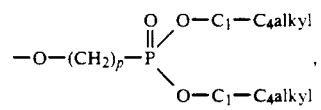

$R_2$, $R_4$, $R_{21}$ and $R_{24}$ are each, independently of the other, hydrogen or $C_1$–$C_4$alkyl,
$R_5$ is hydrogen or $C_1$–$C_{14}$alkyl, and
$R_3$ is hydrogen, $C_1$–$C_{12}$alkyl, $C_1$–$C_8$alkoxy, —(CH$_2$)$_n$—CO—OR$_6$, —(CH$_2$)$_n$—CO—N(R$_7$)$_2$, —(CH$_2$)$_n$—CO—OR$_{11}$ or —Y—E.

11. A composition according to claim 10, wherein,
  $R_1$, when G is a direct bond, is hydrogen, $C_1$–$C_{18}$alkyl, benzyl, allyl, isoallyl, $C_1$–$C_{18}$alkanoyl, or $C_1$–$C_{12}$alkanoyl interrupted by oxygen, or
  $R_1$, when G is a group —$CR_{18}R_{19}$—CO—, is hydroxy, $C_1$–$C_{18}$alkoxy, unsubstituted or $C_1$–$C_4$alkyl-substituted phenoxy, —$NR_{14}R_{15}$ or

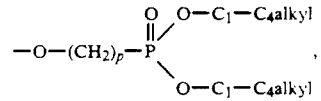

$R_2$ and $R_4$ are hydrogen,
$R_3$ and $R_5$ are each, independently of the other, $C_1$–$C_{18}$alkyl interrupted by oxygen, or $C_1$–$C_4$alkoxy or cyclohexyl and
$R_3$ in addition is a group —(CH$_2$)$_n$—CO—OR$_{11}$ wherein
$R_{11}$ is hydrogen or $C_1$–$C_4$alkyl, and
$R_{14}$ and $R_{15}$ are hydrogen or $C_1$–$C_4$alkyl.

12. A process for the stabilisation of polyether polyols which comprises adding thereto at least one compound of formula I according to claim 1 in combination with at least one compound from the group of the phenolic anti-oxidants, and/or at least one compound from the group of the amino anti-oxidants of the secondary amine type.

* * * * *